United States Patent [19]
Lundquist et al.

[11] 3,909,672
[45] Sept. 30, 1975

[54] CAPACITOR BANK PROTECTION RELAY

[75] Inventors: Thomas G. Lundquist, Salt Lake, Utah; Victor Burtnyk, Winnepeg, Canada

[73] Assignee: Westinghouse Electric Corporation, Pittsburgh, Pa.

[22] Filed: Feb. 7, 1974

[21] Appl. No.: 440,606

[52] U.S. Cl. .............................. 317/12 B; 324/126
[51] Int. Cl.² .......................................... H02H 7/16
[58] Field of Search ............. 317/12 B, 12 R, 12 A; 324/126

[56] References Cited
UNITED STATES PATENTS
| | | | |
|---|---|---|---|
| 3,158,783 | 11/1964 | Minder | 317/12 |
| 3,340,432 | 9/1967 | Ainsworth | 317/12 |
| 3,591,831 | 7/1971 | McConnell | 317/12 |

*Primary Examiner*—James D. Trammell
*Attorney, Agent, or Firm*—J. L. Stoughton

[57] ABSTRACT

A protective relay for shunt capacitor banks which is arranged to provide a neutralizing signal which balances any initial unbalance inherent in the capacitor bank which may be due to slight differences in the capacitors which make up the bank so that initially the output signal is substantially zero whereby the sensitivity of the relay to the failure of one or more of the parallel series connected capacitors is considerably increased without the necessity of amplification or other complications. The relay further is rendered insensitive to varying unbalances present in the polyphase transmission line, not caused by capacitor failure, by the use of resistive elements connected to compensate for line unbalance. These resistors will be more secure against failure than the capacitor elements used in the shunt capacitor banks.

9 Claims, 3 Drawing Figures

U.S. Patent  Sept. 30,1975  3,909,672

CAPACITOR BANK PROTECTION RELAY

BACKGROUND OF THE INVENTION

Shunt capacitor banks are commonly used with high voltage transmission lines for power factor improvement to increase the power transmission capacity of the line. These banks normally contain a series parallel string of capacitors associated with each of the phase conductors of the line with each capacitor being protected by its individual fuse. These strings of capacitors may be connected in delta or wye with or without the neutral being grounded. When any individual capacitor fails its individual fuse blows and the remaining capacitors in that string or group will be subjected to an overvoltage. When enough capacitors fail in a group and the voltage to which the remaining capacitors are subjected reaches or exceeds the maximum permissible continuous voltage an associated protecting relay deenergized the capacitor bank.

One prior art method is to measure the voltage between ground and the neutral of the wye connected capacitor bank in the case of an ungrounded bank or the magnitude of the current flow to ground in the case of a grounded wye connected bank. In the case of a delta connected bank, the circulating or unbalance current may be used for detecting impedance unbalance.

A more complete discussion of the prior art practices may be found in a paper entitled Philosophy of Shunt Capacitor Bank Protection presented at the 1973 conference for protective relay engineers held at Texas A&M University College Station, Tex. The paper was widely distributed and a copy thereof is located, among other places, in a bound volumn entitled Proceedings of the Conference for Protective Relay Engineering, April 1973 located in the library of Texas A&M University, College Station, Tex.

An unbalance in the current through the legs of the bank can occur with changes in the operation of the power system with which such bank is connected. Such change may result from many causes such as untransposed transmission lines, unequal phase loading, and phase to phase and/or phase to ground faults as well as the failing of a capacitor within the capacitor bank. As described in the above cited paper, this unbalance may be compensated for by comparing the neutral potential or current with that of a second capacitor bank (FIGS. 2c, 3b, 3c and 4b).

In FIGS. 2c and 3c, the unbalanced current flowing between the neutrals (FIG. 2c) or to ground (FIG. 3c) actuates a relay when a predetermined unbalance occurs. In FIG. 4b, the relative magnitudes of the currents flowing through the corresponding pairs of capacitor strings are utilized to actuate the relay 87 when the current through one thereof exceeds the other thereof by a predetermined minimum amount.

No connection is provided for in the circuits or illustrated in FIGS. 2a, 2b or 3a of the paper. In FIG. 2b the voltage from neutral to ground of the ungrounded wye connected capacitor bank is utilized. In FIGS. 3a the circulating current through the delta connected secondaries of the transformers (which individually measure the potential across the diagrammatically illustrated wye connected string of capacitors) is utilized. In FIGS. 4a the voltage across the last group of capacitors of each leg of the grounded capacitor bank is compared with a proportional voltage of the corresponding phase conductor and when the difference therebetween exceeds a predetermined magnitude the relay 87V is actuated.

It was the conclusion of the author off this paper that as the voltages at which power is being transmitted increases, the error signal produced due to a faulted capacitor becomes too small to provide a satisfactory signal when capacitors commercially available are utilized.

The highest voltage rated capacitors presently available are rated at 200kVAR at 19.9kV. As shown in FIG. 8 of the paper, with line voltages of 199kV the current incremental change is only 1 ampere (10 capacitors in series). With the modern transmission potentials of 750kV the number of capacitor in series will be 38 and the incremental change in current would be about 0.28 amps. This is approximately 0.14% as compared with 2.5% at 39.8kV and 0.5% at 199.2kV. At proposed line potentials of 1000 kV the percentage in current change would be approximately 0.1%. Based upon these considerations, the paper points out that the utilization of ground current flow is unsatisfactory for detecting the failure of a single capacitor even though the largest commercially available type is used. Similarly in ungrounded capacitor banks the increase in line voltage and the consequent increase in the number of series capacitors in each string decreases the change in neutral voltage available for detecting the failure of a single capacitor.

SUMMARY OF THE INVENTION

In accordance with this invention a compensating quantity is provided to compensate for the inherent impedance unbalance which will inevitably occur because of the practical impossibility of providing a shunt capacitor bank in which the capacitors are exactly identical and consequently would have no unbalance current or voltage whether it be circulating in a delta connection or appear in the wye connection of a grounded or ungrounded capacitor bank. This compensating quantity may be obtained as illustrated in FIGS. 1 and 2 by providing a polyphase resistive element network or other suitable impedance networks wherein the resistance of the relay strings may be adjusted to provide a compensating quantity of correct magnitude and phase angle for substantially eliminating the effect of initial impedance and unbalance inherent in the capacitor bank by proportionately matching the capacitor bank unbalance with the adjustable elements. Further the unbalance at the capacitor bank neutral due to system unbalances will also appear at the neutral of the impedance element network of the relay, and this is used to compensate for that appearing across the relay due to the capacitor bank also having the system unbalance appearing at the capacitor bank neutral. In the form of the invention of FIG. 3, the compensating quantity is provided from a source of single phase alternating potential of the same hertz as the line and which is of correct magnitude in phase to neutralize the inherent initial impedance unbalance between the split wye capacitor banks. As explained in the aforementioned paper, the system unbalance is compensated for by the capacitor bank connection. The provision of this compensating quantity overcomes the necessity of providing the larger unbalance signal otherwise required for capacitor failure detection and the absence of which dictated the use of separate single phase measurement of the current through each string as suggested in the above

DETAILED DESCRIPTION OF THE EMBODIMENTS

Figure 1:
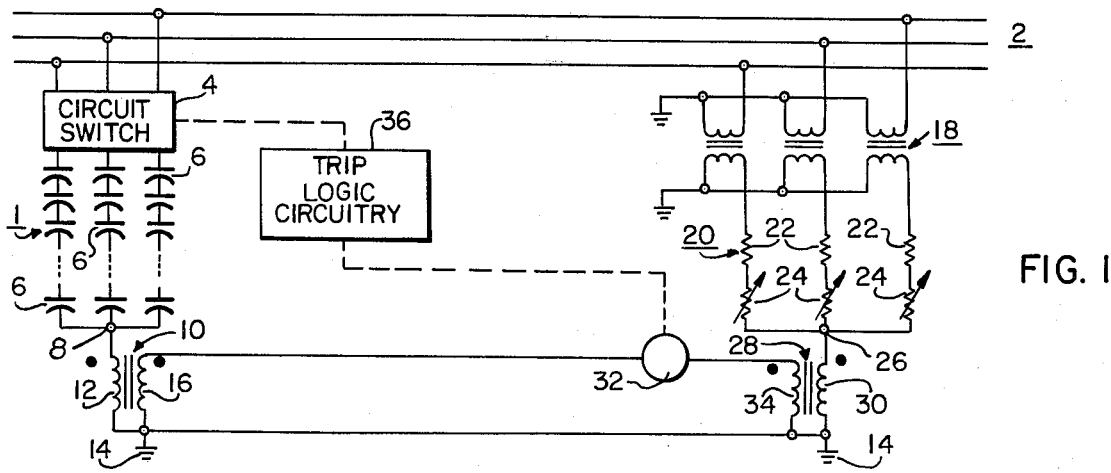
FIG. 1 is a schematic view of a relay protected wye connected ungrounded shunt capacitor bank embodying a preferred form of the invention.

Referring to the drawings by characters of reference, the numeral 1 indicates a wye connected ungrounded shunt capacitor bank connected to a three phase power transmission line 2 through a switch 4. The capacitor bank 1 comprises a leg or string of capacitors 6 for each phase conductor of the line 2. One end of each of the legs is individually connectable to and disconnectable from the phase conductors by the switch 4. The other end of the legs are connected together in polyphase wye connection to provide a neutral connection 8. The bank 1 is illustrated in simple form as having each leg comprised of a plurality of series connected capacitors. The specific connection of the wye connected capacitors is not material to the present invention and may take many of various specific connections of parallel and series grouping of capacitors as is well known in the art.

In some embodiments, such as that illustrated, the failure by shorting (the usual failure) will decrease the impedance and increase the current. If fuses are used and the strings or legs embody a series parallel arrangement of capacitors, the failure of a capacitor by shorting results in a blown fuse thereby disabling one branch of a parallel circuit and an increased impedance and decreased current flow through the leg having the faulted capacitor. The invention is useful with any combination in which the faulting of a capacitor will result in a change in the current flow through the capacitor bank. In the case of the ungrounded wye connection of FIG. 1, a change in potential of the neutral with respect to ground will result. This change may be sensed by a potential transformer 10 having its high impedance primary winding 12 connected between the neutral 8 and ground 14 whereby the output potential of the secondary winding is altered.

An adjustable compensating quantity, for comparison with the output quantity of the bank 1 as delivered by the transformer 10, is derived from the phase conductors of the transmission line 2 through the usual station potential transformer array 18. The three phase output of this transformer array is supplied to a wye connected bank 20 of primarily resistive impedance elements 22 and 24, at least one or two of the elements 22 or elements 24 being adjustable in magnitude whereby the phase angle and magnitude of the potential to ground of the neutral bus 26 may be adjusted.

A second potential transformer 28 has its high impedance primary winding 30 connected between the neutral 26 and ground 14. A suitable potential differential relay 32 is connected to compare the output quantity of the winding 16 with that of the secondary winding 34.

The impedances of the impedance bank 20 are adjusted to provide an output potential of the bus 26 with respect to ground such that an input signal to the relay 32 will be substantially equal and opposite to the input signal supplied to the relay 32 from the transformer 10. With this arrangement the error or unbalance potential of the neutral 8 caused by the inherent differences of the capacitors in the bank 1 are substantially completely compensated. With such a complete compensation, the relay 32 will respond to the small changes in unbalance currents and resulting unbalanced potentials which occur at the higher transmission line potentials.

The protective relay includes trip and alarm logic circuitry 36 which is actuated by the relay 32 when the differential potential supplied thereto exceeds a predetermining minimum magnitude. The trip logic circuitry may be conventional and may include a time delay apparatus to open the switch 4 a predetermined time interval subsequent to the actuation of the relay 32 in response to the faulting of a desired number of capacitors 6 and also provide alarm on the failure of the first unit.

Figure 2:
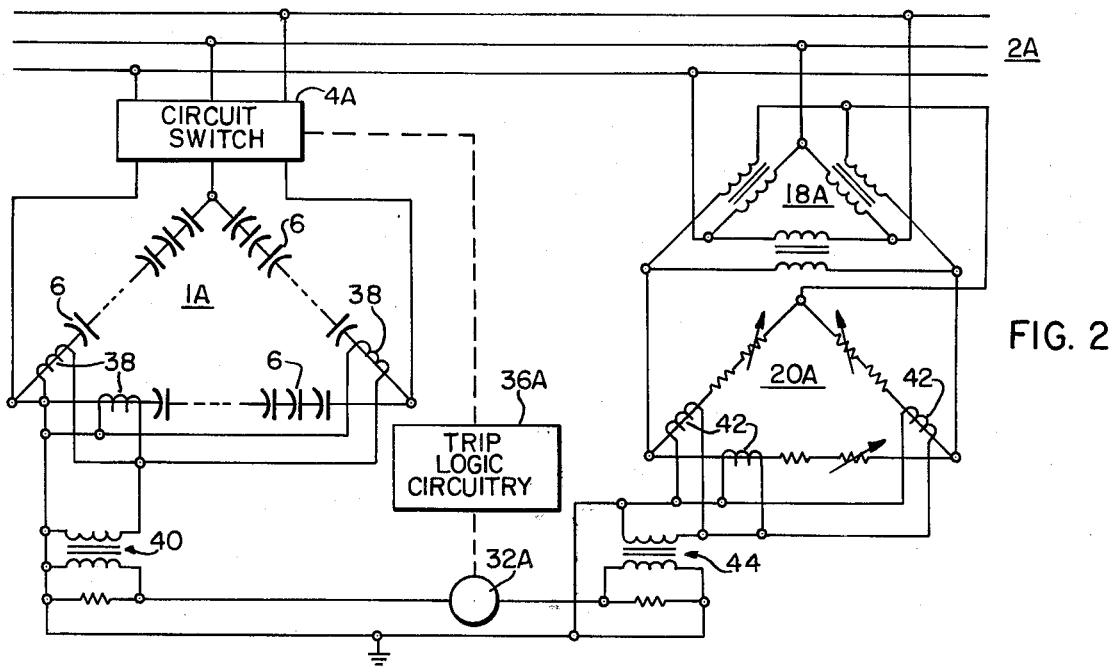
FIG. 2 illustrates in, schematic form, a form of the invention as applied to a delta connected ungrounded shunt capacitor bank; and, FIG. 3 is a schematic view of a relay protected split wye ungrounded shunt capacitor bank embodying a modified form of the invention.

In FIG. 2 the legs or capacitor strings of the capacitor bank 1A, the potential transformer array 18A and impedance bank 20A are all connected in delta. The unbalance current flowing in the delta connected capacitor bank 1A is measured by the current transformer 38. The secondary windings of the transformer and the primary winding of a residual current energized transformer 40 are connected in parallel. With this arrangement any unbalance current in the bank 1A is represented as an output of the residual current transformer 40. Similarly the current transformers 42 measure the current in each of the legs of the delta connected impedance bank 20A and the residual current is measured by the residual current transformer 44. The difference in the outputs of residual current transformer 40 and 44 is supplied to the potential differential relay 32A which controls the trip logic circuitry which in turn controls the switch 4A. When the difference between the output quantities of the transformers 40 and 44 exceeds a predetermined magnitude, indicating that a predetermined number of the capacitors of one of the legs or capacitor string of the bank 1A have faulted, (this number can be 1 or more depending upon design conditions), the relay 32A will actuate the logic circuitry and thereby open the switch 4A.

Figure 3:
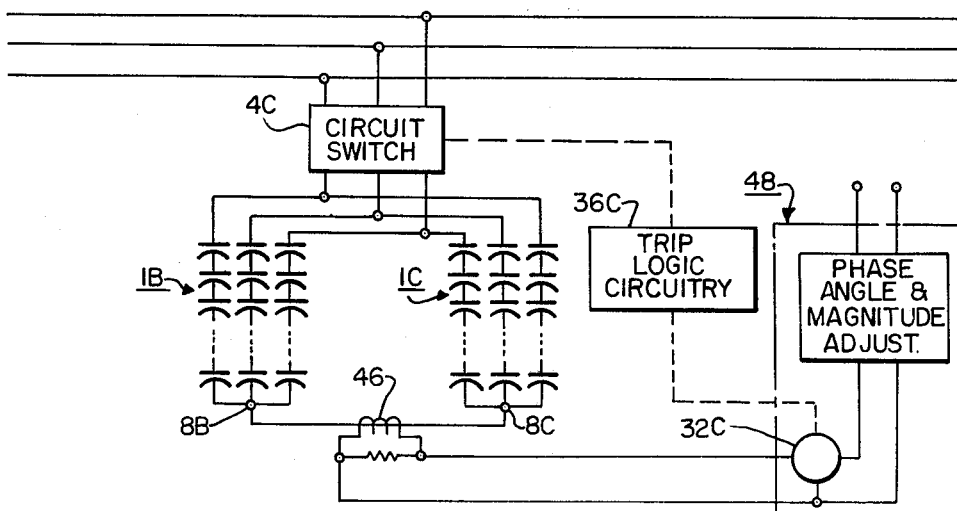

In FIG. 3, a split wye bank construction is illustrated which comprises wye connected banks 1B and 1C energized from the transmission line through a switch 4C. The neutrals 8B and 8C of the banks 1B and 1C are connected together through the primary winding of a current transformer 46. The banks 1B and 1C serve to compensate each other for line unbalance similarly to the split wye arrangements of the above identified paper. In FIG. 3 however the initial inherent impedance unbalance of the banks 1B and 1C is additionally compensated by an AC source 48 which supplies an output quantity to the potential differential relay 32C which neutralizes the effect of the initial inherent impedance unbalance between the banks 1B and 1C which is supplied to the relay 32C from the transformer 46. When the predetermined number of capacitors have faulted or the first capacitor fails, the relay 32C actuates this trip logic circuitry 36C resulting in the opening of the switch 4C or in providing an alarm.

What is claimed and is desired to be secured by United States Letters Patent is as follows:

1. A protective relay for protecting a polyphase shunt capacitor bank energized from a polyphase power transmission line in which said bank includes a plurality of arrays of interconnected capacitors, said relay comprising, a first circuit means operatively connected to said polyphase capacitor bank and sensing the magnitude of the current through each of said capacitor arrays established as a consequence of the operation of said capacitor bank, said first means having an output circuit energized with a first output quantity having a magnitude which is a function of the change in relative operating condition of said capacitor arrays, a second circuit means consisting solely of substantially resistive elements operatively connected to said polyphase line and sensing the magnitude of a desired electrical component established as a consequence of the opertion of said transmission line, the magnitude of said second output quantity being a function of the magnitude of the voltage relations between the conductors said polyphase line, and third circuit means operatively connected to said output circuits of said first and second circuit means, said third circuit means having an output circuit energized in response to a change in the relative in magnitudes of said first and second output quantities.

2. The relay of claim 1 in which said resistive elements are connected together in the same polyphase configuration as are the arrays of capacitors of said capacitor bank.

3. The relay of claim 2 in which said resistive elements and said arrays of said capacitors of said bank are both connected in delta configuration.

4. The relay of claim 1 in which said resistive elements and said capacitor arrays are connected in wye configuration and in which said first and second output quantities are determined as a function of the magnitudes of said components between the neutral of the respective said wye configurations and ground.

5. The relay of claim 4 in which each of said first and second circuit means individually includes the winding of an individual transformer.

6. The relay of claim 5 in which said windings of said transformers are of high impedance and said output quantities are voltage quantities.

7. A protective relay for protecting a polyphase shunt capacitor bank energized from a polyphase power transmission line, said relay comprising, a first circuit means operatively connected to said capacitor bank and operable to sense the magnitude of the unbalance in a desired electrical quantity present in said capacitor bank, a second circuit means consisting solely of substantially resistive elements operatively connected to said polyphase line and operable to sense the unbalanced magnitude of said desired electrical quantity present in said line independently of the magnitude of the unbalance of said quantity caused by the operation of said capacitor bank, and third circuit means interconnecting said first and second circuit means and effective to provide a desired output signal when the magnitude of unbalance of said quantities sensed thereby reaches a predetermined established magnitude, and adjustable means altering the effect of the relative magnitude of unbalance of said quantity sensed by said second circuit means to compensate for any initial inherent unbalance of said quantity present in said capacitor bank whereby the initial relative magnitude with unfaulted capacitors in said bank is substantially zero.

8. The relay of claim 7 in which the capacitors of said capacitor bank are connected in the same array as are the resistive elements of said second circuit means.

9. The relay of claim 8 in which said capacitors and said resistive elements are connected in wye.

* * * * *